(12) United States Patent
Ishizuka et al.

(10) Patent No.: US 8,673,546 B2
(45) Date of Patent: Mar. 18, 2014

(54) PROCESS FOR FORMING A HYDROPHILIC COATING AND HYDROPHILIC COATING, AND PROCESS FOR FORMING AN INK JET RECORDING HEAD AND INK JET RECORDING HEAD

(75) Inventors: Kazunari Ishizuka, Suntou-gun (JP); Ken Ikegame, Atsugi (JP); Shoji Shiba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 13/281,124

(22) Filed: Oct. 25, 2011

(65) Prior Publication Data

US 2012/0115985 A1 May 10, 2012

(30) Foreign Application Priority Data

Nov. 9, 2010 (JP) ................. 2010-250777

(51) Int. Cl.
*G03F 7/00* (2006.01)
(52) U.S. Cl.
USPC .......................................... 430/320; 430/325
(58) Field of Classification Search
USPC .......................................... 430/312, 320, 325
See application file for complete search history.

(56) References Cited

U.S. PATENT DOCUMENTS

| | | | |
|---|---|---|---|
| 4,657,631 A | 4/1987 | Noguchi | |
| 5,524,784 A | 6/1996 | Shiba et al. | |
| 5,663,752 A | 9/1997 | Imamura et al. | |
| 5,922,401 A | 7/1999 | Kashiwazaki et al. | |
| 6,312,771 B1 | 11/2001 | Kashiwazaki et al. | |
| 7,175,973 B2 | 2/2007 | Okano et al. | |
| 7,670,757 B2 * | 3/2010 | Shiba et al. | 430/320 |
| 7,687,552 B2 | 3/2010 | Otaka et al. | |
| 7,709,554 B2 | 5/2010 | Otaka et al. | |
| 7,887,162 B2 | 2/2011 | Otaka et al. | |
| 7,947,336 B2 | 5/2011 | Otaka et al. | |
| 2002/0058210 A1 * | 5/2002 | Noguchi et al. | 430/326 |
| 2007/0077520 A1 * | 4/2007 | Maemoto | 430/270.1 |
| 2010/0028803 A1 * | 2/2010 | Sugimoto et al. | 430/270.1 |
| 2011/0139330 A1 | 6/2011 | Ikegame et al. | |
| 2012/0115089 A1 * | 5/2012 | Ishizuka et al. | 430/320 |

FOREIGN PATENT DOCUMENTS

| | | | |
|---|---|---|---|
| JP | 6-122210 A | 5/1994 | |
| JP | 6-45242 B2 | 6/1994 | |

OTHER PUBLICATIONS

Ishizuka, et al., U.S. Appl. No. 13/281,172, filed Oct. 25, 2011.
Shiba et al., U.S. Appl. No. 13/219,446, filed Aug. 26, 2011.

* cited by examiner

*Primary Examiner* — Stewart Fraser
(74) *Attorney, Agent, or Firm* — Fitzpatrick, Cella, Harper and Scinto

(57) ABSTRACT

A process for forming a hydrophilic coating, including (1) forming, on a substrate, coating resin layer including a cationic polymerization resin having an acid-cleavable linkage in its main chain, and a photoacid generator which generates antimonic acid or an acid having a weaker acid strength than that of antimonic acid by irradiation with active energy ray including ultraviolet light; (2) laminating, on the resin layer, a photoacid generator holding layer including a photoacid generator which generates an acid having a stronger acid strength than that of antimonic acid by irradiation with the energy ray, and a holder which holds the photoacid generator and can be removed in step (3); (3) removing the holding layer and curing the resin layer through exposure of those layers to the energy ray to conduct development; and (4) forming a hydrophilic coating by hydrophilizing a surface of the resin layer through heat treatment thereof.

12 Claims, 5 Drawing Sheets

PROCESS FOR FORMING A HYDROPHILIC COATING AND HYDROPHILIC COATING, AND PROCESS FOR FORMING AN INK JET RECORDING HEAD AND INK JET RECORDING HEAD

BACKGROUND OF THE INVENTION

1. Field of the Invention

The present invention relates to a process for forming a hydrophilic coating and a hydrophilic coating formed by such process, and a process for forming an ink jet recording head including the hydrophilic coating and an ink jet recording head formed by such process.

2. Description of the Related Art

A technology for performing patterning by processing a resin composition by photolithography is applied in a variety of fields. Examples of the technology include a process for forming an ink jet recording head.

An ink jet recording head for performing recording by ejecting ink onto a recording medium generally includes multiple fine ink ejection orifices, ink flow paths, and energy generating elements for generating energy necessary for ejecting ink to be provided in parts of the ink flow paths.

Japanese Examined Patent Publication No. H06-45242 describes a process of producing such ink jet recording head. First, an ink flow path pattern is formed with a soluble resin on a substrate having energy generating elements formed thereon. Next, a coating resin layer including a cationic polymerization resin and a photoacid generator is formed on the ink flow path pattern, and ink ejection orifices are formed above the energy generating elements by photolithography. Finally, the soluble resin is dissolved and the coating resin layer is then cured to form an ink flow path member.

In general, in order to achieve high printing quality and constantly provide a stable printing effect in an ink jet printer, it is necessary that ink to be ejected from ink ejection orifices be constantly ejected in a vertical direction with respect to an ink ejection orifice surface. When a non-uniform ink pool is present in the ink ejection orifice surface at the time of ejection or the pool is formed during the ejection, ink to be ejected is attracted into the ink pool, and the flying direction of each of ink droplets deviates from the normal direction, with the result that normal ejection is not achieved in some cases. Further, when the array density of ink ejection orifices is increased in order to improve printing quality, an array distance between the ink ejection orifices becomes shorter depending on the increase, and hence the ejection is more liable to be affected by the non-uniform ink pool in the ink ejection orifice surface.

In view of the foregoing, there have been reported a large number of proposals concerning solving the above-mentioned problems by subjecting an ink ejection orifice surface to water-repellent treatment for repelling ink, thereby providing stable ink droplets. Further, in contrast, there has also been reported a proposal concerning ensuring uniform wetness in an ink ejection orifice surface by subjecting the ink ejection orifice surface to hydrophilic treatment for wetting the surface with ink.

Japanese Patent Application Laid-Open No. H06-122210 describes those surface treatment processes. For example, examples of the process for subjecting an ink ejection orifice surface to water-repellent treatment include a process including applying a fluorine-based water repellent. Meanwhile, examples of the process for subjecting an ink ejection orifice surface to hydrophilic treatment include a process including performing hydrophilization by generating a polar group in the ink ejection orifice surface by acid treatment, plasma treatment, or the like.

As described above, the conventional processes each require an apparatus exclusively used for acid treatment, plasma treatment, or the like in the formation of a hydrophilic coating, and the hydrophilic coating cannot be formed with a photolithography apparatus alone, with the result that a large burden is imposed in some cases.

As described above, even in the case where an ink jet recording head is formed by photolithography, a process including applying a fluorine-based water repellent or the like has only to be employed in order to subject an ink ejection orifice surface to water-repellent treatment, and a conventional apparatus may be used. However, an apparatus exclusively used for acid treatment, plasma treatment, or the like is required for subjecting the ink ejection orifice surface to the hydrophilic treatment, and the hydrophilic coating cannot be formed with the conventional apparatus alone, with the result that a large burden is imposed on a forming step in some cases.

An object of the present invention is to provide a process for forming a hydrophilic coating easily by photolithography without requiring any apparatus exclusively used for hydrophilic treatment and a hydrophilic coating formed by the process. Another object of the present invention is to provide a process for forming an ink jet recording head including the hydrophilic coating and an ink jet recording head formed by the process.

SUMMARY OF THE INVENTION

According to the present invention, a process for forming a hydrophilic coating having a hydrophilized surface includes the steps of:

(1) forming, on a substrate, a coating resin layer including a cationic polymerization resin which includes an acid-cleavable linkage in its main chain, and a photoacid generator which generates antimonic acid or an acid having a weaker acid strength than that of antimonic acid by irradiation with an active energy ray including ultraviolet light;

(2) laminating, on the coating resin layer, a photoacid generator holding layer including a photoacid generator, which generates an acid having a stronger acid strength than that of antimonic acid by irradiation with the active energy ray, and a holder, which holds the photoacid generator and can be removed in the step (3);

(3) removing the photoacid generator holding layer and curing the coating resin layer through exposure of the photoacid generator holding layer and the coating resin layer to the active energy ray to conduct development; and (4) forming a hydrophilic coating by hydrophilizing a surface of the coating resin layer cured in the step (3) through heat treatment of the coating resin layer.

The present invention also provides a hydrophilic coating, which is obtained by the process for forming a hydrophilic coating, in which a surface of the hydrophilic coating has a polar group generated by cleavage of the cationic polymerization resin, and the surface has a static contact angle with pure water of 20° or less.

The present invention also provides a process for forming an ink jet recording head including: a substrate having energy generating elements formed thereon for generating energy necessary for ejecting ink; and an ink flow path member, which forms ejection orifices for ejecting ink and an ink flow path communicating with the ejection orifices and holding ink, and which is hydrophilized in its surface having the ejection orifices, the process including the steps of:

(I) forming, on a substrate having energy generating elements formed thereon, a coating resin layer including a cationic polymerization resin which includes an acid-cleavable linkage in its main chain, and a photoacid generator which generates antimonic acid or an acid having a weaker acid strength than that of antimonic acid by irradiation with an active energy ray including ultraviolet light;

(II) laminating, on the coating resin layer, a photoacid generator holding layer including a photoacid generator, which generates an acid having a stronger acid strength than that of antimonic acid by irradiation with the active energy ray, and a holder, which holds the photoacid generator and can be removed in the step (III);

(III) forming the ejection orifices by removing the photoacid generator holding layer and curing the coating resin layer through exposure of the photoacid generator holding layer and the coating resin layer to the active energy ray to conduct development; and (IV) forming the ink flow path member by hydrophilizing a surface having the ejection orifices of the coating resin layer cured in the step (III) through heat treatment of the coating resin layer.

The present invention also provides an ink jet recording head, which is obtained by the process for forming an ink jet recording head, in which a surface having the ejection orifices has a polar group generated by cleavage of the cationic polymerization resin, and the surface having the ejection orifices has a static contact angle with pure water of 20° or less.

Further features of the present invention will become apparent from the following description of exemplary embodiments with reference to the attached drawings.

DESCRIPTION OF THE EMBODIMENTS

Figure 1:
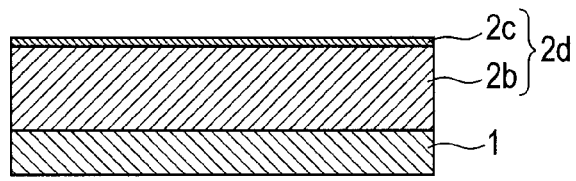
FIG. 1 is a schematic cross-sectional view of a hydrophilic coating formed by a process for forming a hydrophilic coating according to the present invention.

The inventor of the present invention has made intensive studies in order to solve the above-mentioned problems. As a result, the inventor has found a process for forming a hydrophilic coating by generating a polar group in a surface of a coating resin layer including a specific cationic polymerization resin and a specific photoacid generator by photolithography. It should be noted that the "hydrophilic coating" as used herein refers to a coating having a static contact angle with pure water of 20° or less. According to the present invention, the hydrophilic coating can be formed easily by conventional photolithography without requiring any apparatus exclusively used for hydrophilic treatment. The process for forming a hydrophilic coating according to the present invention is applicable to a process for forming semiconductor, an MEMS field, and the like as well as a process for forming an ink jet recording head.

Hereinafter, the present invention is specifically described with reference to drawings. It should be noted that in the following description, a construction having the same function is provided with the same numeral in the drawings, and its description may be omitted.

The process for forming a hydrophilic coating according to the present invention includes the steps of:

(1) forming, on a substrate, a coating resin layer including a cationic polymerization resin which includes an acid-cleavable linkage in its main chain, and a photoacid generator (photoacid generator A) which generates antimonic acid or an acid having a weaker acid strength than that of antimonic acid by irradiation with an active energy ray including ultraviolet light;

(2) laminating, on the coating resin layer, a photoacid generator holding layer including a photoacid generator (photoacid generator B), which generates an acid having a stronger acid strength than that of antimonic acid by irradiation with the active energy ray, and a holder, which holds the photoacid generator and can be removed in the step (3);

(3) removing the photoacid generator holding layer and curing the coating resin layer through exposure of the photoacid generator holding layer and the coating resin layer to the active energy ray to conduct development; and (4) forming a hydrophilic coating by hydrophilizing a surface of the coating resin layer cured in the step (3) through heat treatment of the coating resin layer.

FIG. 1 illustrates an example of a hydrophilic coating formed by the process for forming a hydrophilic coating according to the present invention. A substrate is represented by reference numeral 1 and a coating having a hydrophilized surface (hydrophilic coating) is represented by reference numeral 2d. The hydrophilic coating 2d has a cured coating resin layer 2b and a hydrophilic layer 2c on its surface. Hereinafter, the process for forming a hydrophilic coating of FIG. 1 is described with reference to FIGS. 2A to 2E. However, the present invention is not limited thereto.

Step (1)

Figure 2A:
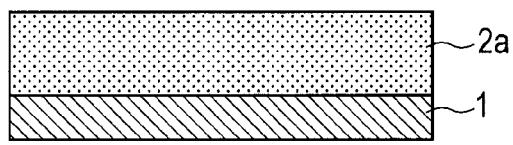
FIGS. 2A, 2B, 2C, 2D and 2E are views for illustrating the respective steps of the process for forming a hydrophilic coating according to the present invention.

First, a coating resin layer 2a including a cationic polymerization resin and a photoacid generator A is formed on a substrate 1 (FIG. 2A). It should be noted that the coating resin layer 2a may be formed directly on a surface of the substrate 1, or alternatively, any other layer (for example, positive photosensitive resin layer) may be provided between the substrate 1 and the coating resin layer 2a. The cationic polymerization resin may be any such compound that includes an acid-cleavable linkage such as an ether linkage or an ester linkage in its main chain as represented, for example, by each of the following formula 1-a to the following formula 1-i. It should be noted that the "main chain" means a chain which serves as a backbone in a carbon skeleton of a chain compound and has the maximum number of carbon atoms.

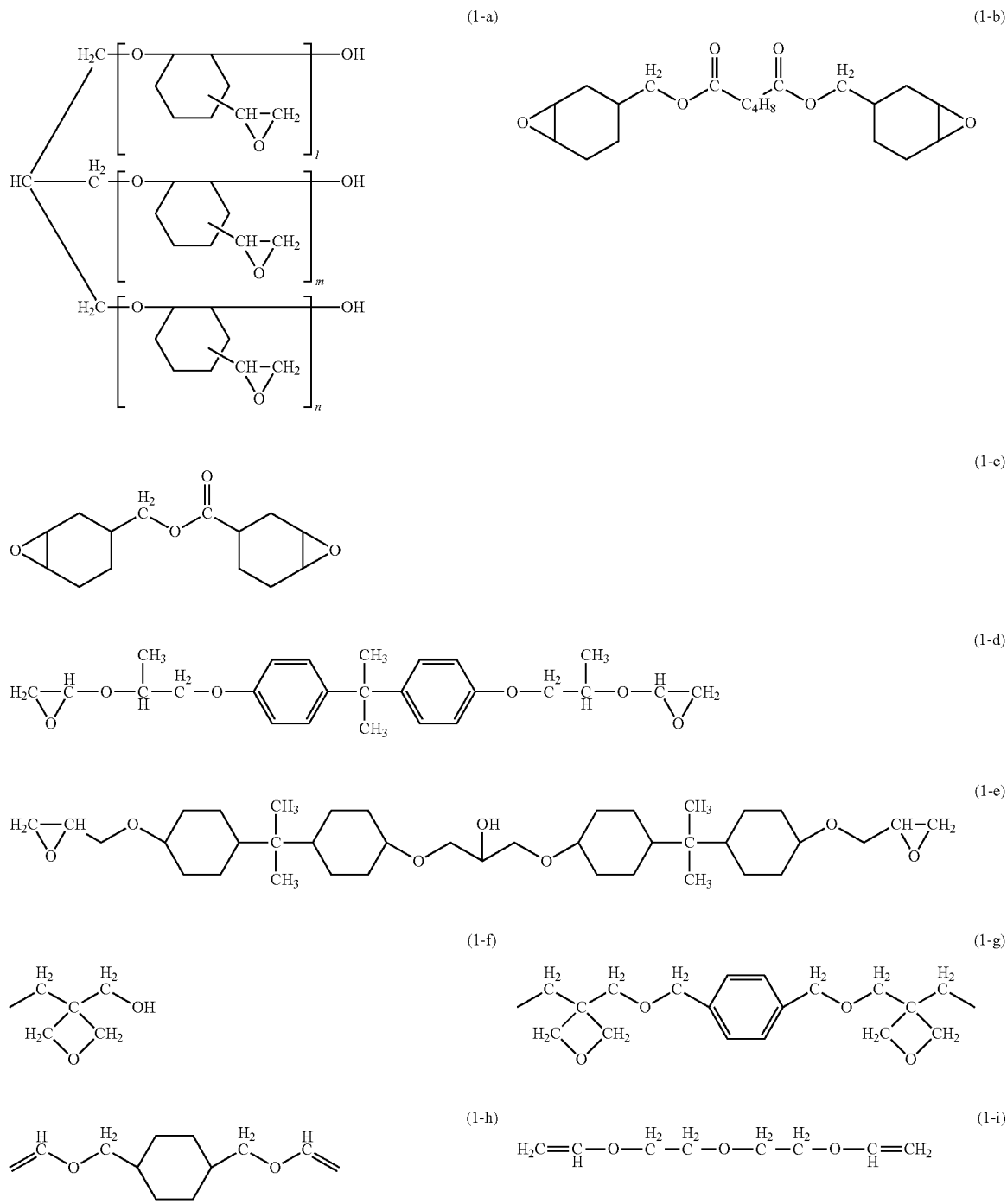

In the above-mentioned formula 1-a, l, m, and n each independently represent an integer of 1 or more.

It should be noted that such a cationic polymerization resin as represented by each of the following formula 2-a to the following formula 2-e is defined as being free of an ether linkage in its main chain in the present invention. Further, in the formula 2-a to the formula 2-e, n represents an integer of 1 or more.

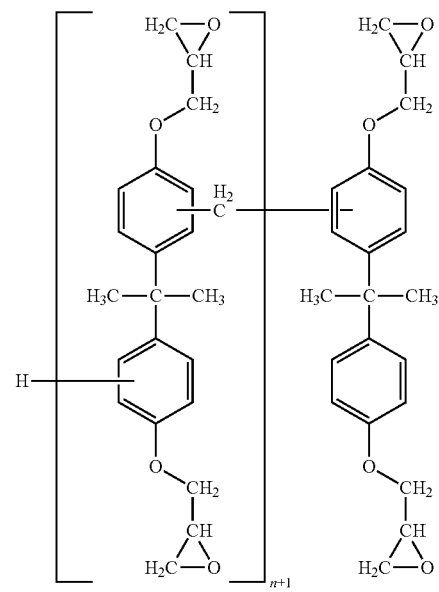

(2-a)

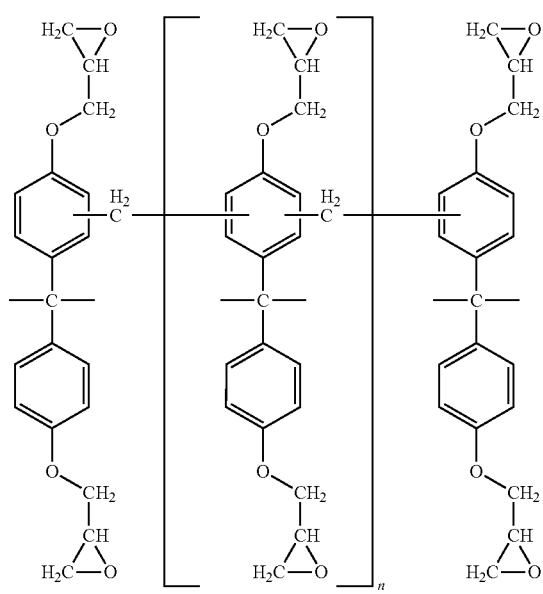

(2-b)

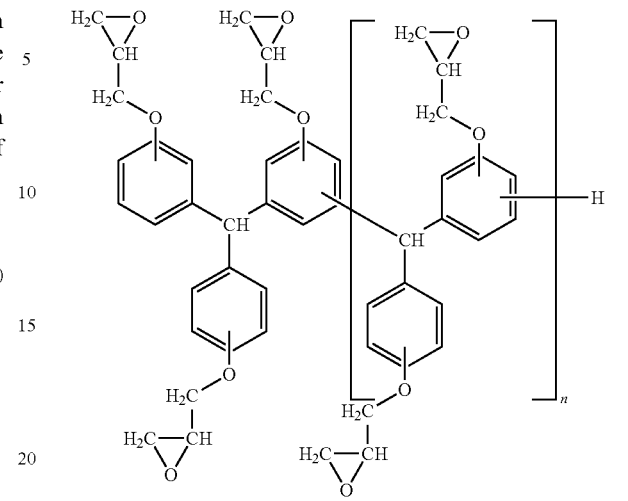

(2-c)

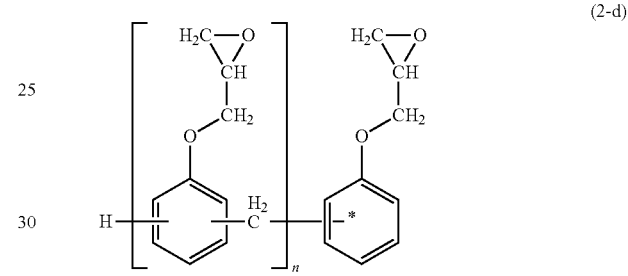

(2-d)

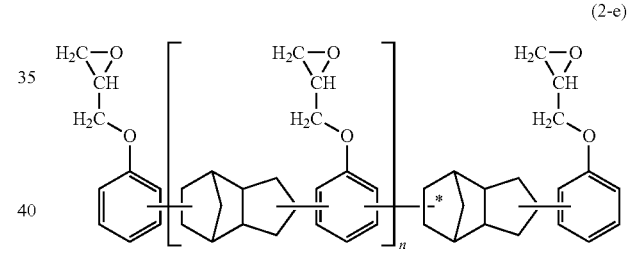

(2-e)

Further, the photoacid generator A contained in the coating resin layer 2a may be any photoacid generator which generates antimonic acid or an acid having a weaker acid strength than that of antimonic acid by irradiation with an active energy ray including light, more specifically ultraviolet light.

Here, the acid strength of the acid generated from the photoacid generator is described with reference to Table 1 below. Table 1 is an example showing photoacid generators and the order of the acid strengths of acids generated from the photoacid generators. It should be noted that the strength of the acid generated from the photoacid generator may be measured by the following process. That is, the strength may be measured by using resin compositions including the same kind of cationic polymerization resin and the same addition amount (molar number) of photoacid generators, and comparing exposure amounts required for forming a certain pattern by photolithography. It can be said that the smaller exposure amount indicates that the photoacid generator generates an acid having a stronger acid strength. It is therefore understood that the order of the acid strengths is the order of methide acid>antimonic acid>phosphoric acid>acetic acid.

TABLE 1

| Photoacid generator | Acid generated | Exposure amount (J/m²) | Order of acid strengths |
|---|---|---|---|
| ![structure] (acetyl-phenyl-S-phenyl)₃-S⁺ (CF₃SO₂)₃C⁻ | Methide acid | 800 | 1 |
| ![structure] (acetyl-phenyl-S-phenyl)₃-S⁺ SbF₆⁻ | Antimonic acid | 2,500 | 2 |
| ![structure] (acetyl-phenyl-S-phenyl)₃-S⁺ PF₆⁻ | Phosphoric acid | 20,000 | 3 |
| ![structure] (acetyl-phenyl-S-phenyl)₃-S⁺ CH₃COO⁻ | Acetic acid | >30,000 | 4 |

That is, examples of the photoacid generator A included in the coating resin layer 2a include a photoacid generator which generates antimonic acid. The photoacid generator which generates antimonic acid has a structure represented by the following formula 3 as an anion moiety.

$$SbF_6^-$$     Formula 3

Specific examples of the photoacid generator which generates antimonic acid are represented by the following formula 4-a to the following formula 4-j, respectively.

(4-a)

(4-b)

(4-c)

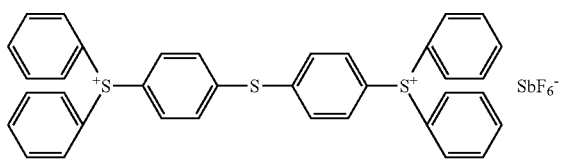
(4-d)

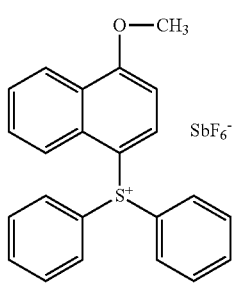
(4-e)

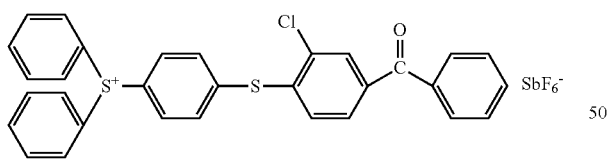
(4-f)

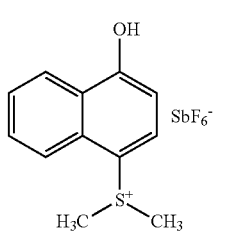

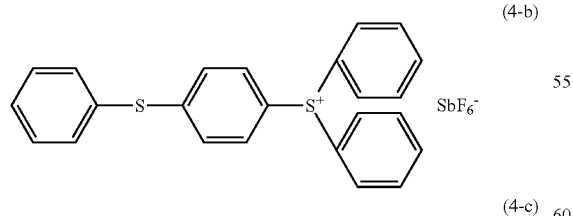
(4-g)

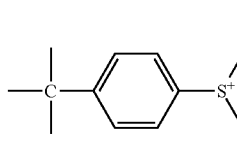
(4-h)

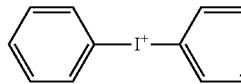

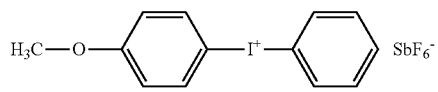
(4-i)

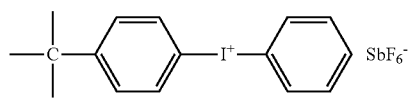
(4-j)

Further, as the photoacid generator A, there may also be used, for example, a compound obtained by changing the anion moiety ($SbF_6^-$) of the compound represented by each of the above-mentioned formula 4-a to formula 4-j to $PF_6^-$ or $CH_3COO^-$.

A process for forming the coating resin layer 2a is, for example, the following process. That is, the process is a process including applying a solution which is obtained by appropriately dissolving materials for the coating resin layer 2a (including a cationic polymerization resin and a photoacid generator A) in a solvent, onto the substrate 1 by a spin coating process. It should be noted that the materials for the coating resin layer 2a may also be applied onto the substrate 1 without using any solvent, but in the case of using a solvent, the solvent is appropriately selected from solvents which do not dissolve the substrate 1 and used.

It should be noted that the coating resin layer 2a may include a functionality-imparting material such as an ultraviolet absorber or a silane coupling agent in addition to the above-mentioned cationic polymerization resin and photoacid generator A. It should be noted that the content of the cationic polymerization resin in the coating resin layer 2a is preferably about 50 mass % or more with respect to the total amount in the case of using a solvent from the viewpoint of coating property. Further, the content of the photoacid generator A in the coating resin layer 2a is preferably about 1 mass % with respect to the cationic polymerization resin from the viewpoint of reactivity.

Step (2)

Figure 2B:
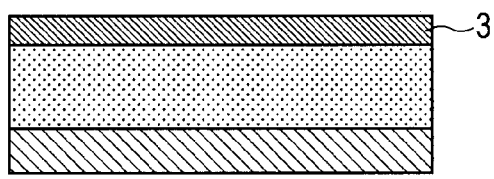

Next, a photoacid generator holding layer 3 including a photoacid generator B and a holder which holds the photoacid generator B and can be removed in the step (3) to be described later is laminated on the coating resin layer 2a (FIG. 2B).

It should be noted that the photoacid generator B included in the photoacid generator holding layer 3 may be any photoacid generator which generates an acid having a stronger acid strength than that of antimonic acid by irradiation with an active energy ray including ultraviolet light. Examples of the photoacid generator B include a photoacid generator which generates methide acid. The photoacid generator which generates methide acid has a structure represented by the following formula 5 as an anion moiety.

Formula 5

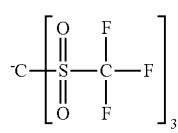

Specific examples of the photoacid generator which generates methide acid are represented by the following formula 6-a to the following formula 6-j, respectively.

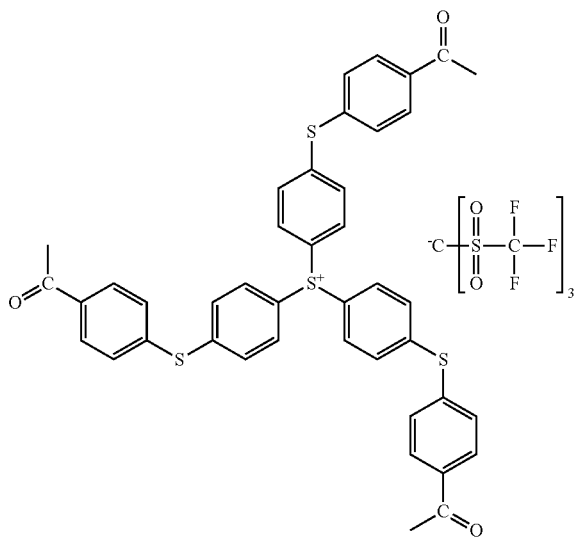
(6-a)

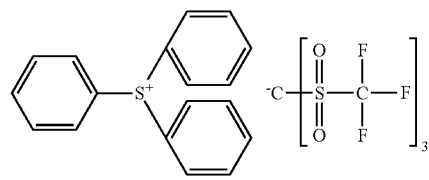
(6-b)

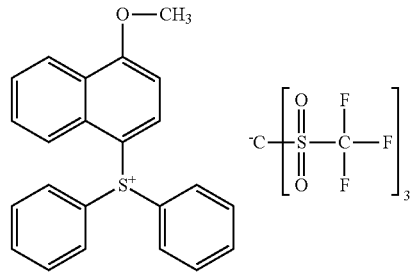
(6-c)

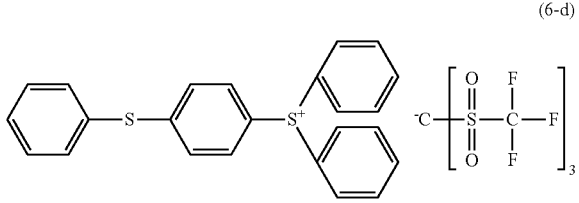
(6-d)

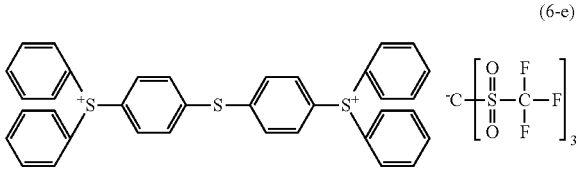
(6-e)

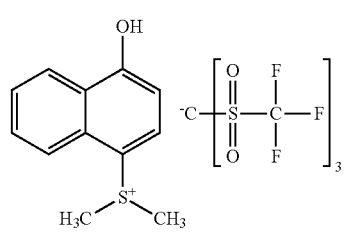
(6-f)

-continued

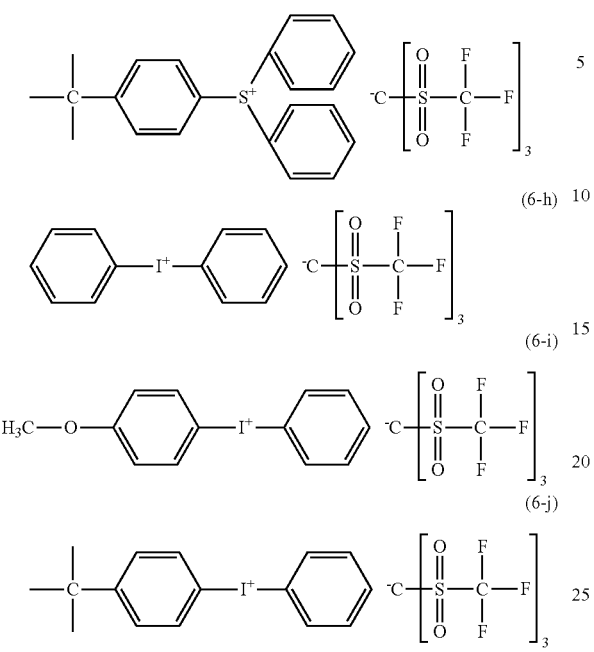

It should be noted that the holder may be any holder which can hold the photoacid generator B in the surface layer of the coating resin layer 2a and which can be removed in the subsequent step (3), i.e., is removed through development treatment in the step (3), and may be a monomer or a polymer. Examples thereof include a novolac resin and a cyclized rubber which do not undergo any cationic polymerization (crosslinking) reaction. It should be noted that the "surface layer of the coating resin layer 2a" means a surface on which a hydrophilic layer is formed.

A process for forming the photoacid generator holding layer 3 is, for example, the following process. That is, the process is a process including applying a solution which is obtained by appropriately dissolving materials for the photoacid generator holding layer 3 (including a holder and a photoacid generator B) in a solvent, onto the coating resin layer 2a by a spin coating process. It should be noted that the materials for the photoacid generator holding layer 3 may also be applied onto the coating resin layer without using any solvent, but in the case of using a solvent, the solvent is appropriately selected from solvents which do not dissolve the coating resin layer 2a and used.

The thickness of the photoacid generator holding layer 3 is not particularly limited as long as the removability is not impaired, but is desirably 3 μm or less in terms of a thickness on the coating resin layer 2a.

Step (3)

Figure 2C:
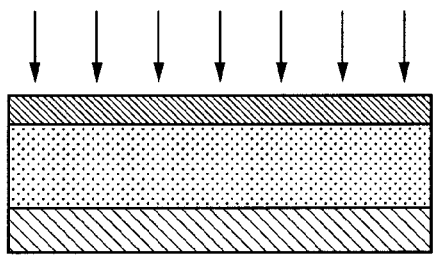
Figure 2D:
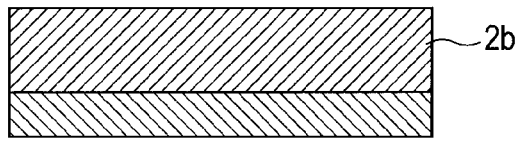

Next, the photoacid generator holding layer 3 is removed and the coating resin layer 2a is cured through exposure of the coating resin layer 2a and the photoacid generator holding layer 3 to an active energy ray including ultraviolet light (arrows in FIG. 2C) to conduct development (FIGS. 2C and 2D). The cured coating resin layer is represented by reference numeral 2b.

It should be noted that, in FIG. 2D, an acid (not shown) generated from the photoacid generator B derived from the photoacid generator layer 3 has been impregnated into the surface layer of the cured coating resin layer 2b.

Step (4)

Figure 2E:
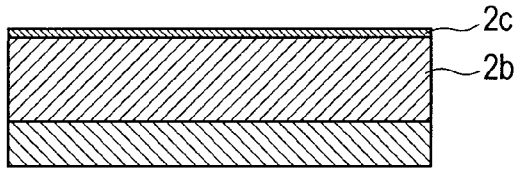

Next, a hydrophilic layer 2c is formed on the surface layer of the cured coating resin layer 2b through heat treatment of the surface layer (FIG. 2E). It should be noted that the heat treatment may be, for example, treatment in an oven or treatment on a hot plate.

The heat treatment may be carried out at any temperature as long as the acid generated from the photoacid generator B derived from the photoacid generator holding layer 3, which has been impregnated into the surface layer of the cured coating resin layer 2b, can cause acid cleavage of the cationic polymerization resin in the surface layer to generate a polar group, hydrophilize the surface layer, and form the hydrophilic layer 2c.

Figure 3:
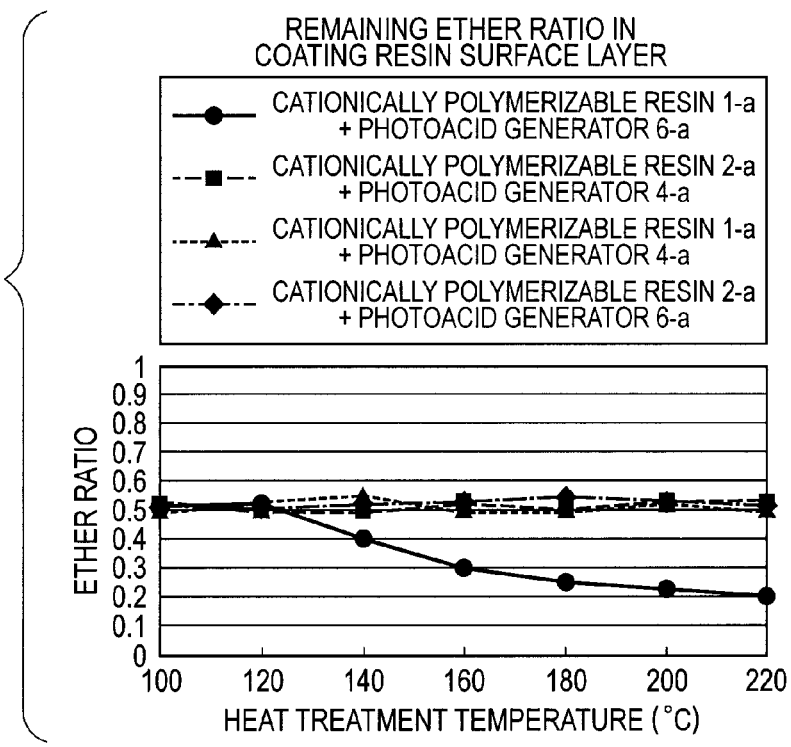
FIG. 3 is a graph showing remaining ether ratios in hydrophilic coating surfaces including cationic polymerization resins.

Here, in order to grasp a correlation between the heat treatment temperatures in the step (4) and the remaining ether ratios in the hydrophilic layer 2c including the cationic polymerization resin having an ether linkage in its main chain, measurement was carried out under the following conditions. Specifically, a coating resin layer including the cationic polymerization resin having an ether linkage as an acid-cleavable linkage in its main chain and the photoacid generator according to a combination described in each of Nos. 1 to 4 of Table 2 was formed directly on the substrate. Then, the coating resin layer was subjected to exposure, development, and heat treatment, and the number of remaining ethers in the surface layer of the coating resin layer (corresponding to the hydrophilic layer 2c) was measured. FIG. 3 shows a graph showing a correlation between the heat treatment temperatures and the remaining ether ratios in the surface layer of the coating resin (coating) under such conditions. It should be noted that the number of ethers is expressed as a ratio of an ether-derived peak intensity when measured with a Fourier transform infrared spectrophotometer (FT-IR) to a peak intensity as a reference. It should be noted that the peak intensity as a reference used here is that of a CH group.

As seen from FIG. 3, in the following combination, the number of remaining ethers in the surface layer of the coating resin layer including the cationic polymerization resin decreases depending on the heat treatment temperature. That is, the combination is a combination of No. 1 described in Table 2, and is a combination including a cationic polymerization resin (1-a), which has an acid-cleavable linkage in its main chain, and a photoacid generator (6-a), which generates an acid having a stronger acid strength than that of antimonic acid, in the coating resin layer. This indicates that the acid having a stronger acid strength than that of antimonic acid (methide acid) generated from the photoacid generator (6-a) causes acid cleavage of an ether linkage in the main chain of the cationic polymerization resin (1-a) through heat treatment to generate a polar group (cause a polar group to be present).

It should be noted that a similar tendency is expected to be observed even in the case of using a cationic polymerization resin including an acid-cleavable linkage other than the ether linkage.

It should be noted that it is understood that No. 3 of Table 2, i.e., a combination including the cationic polymerization resin (1-a) and a photoacid generator (4-a), which generates antimonic acid, in the coating resin layer does not show a decrease in number of ethers in the surface layer of the coating resin layer due to heat treatment. That is, this indicates that the cationic polymerization resin which includes an acid-cleavable linkage in its main chain does not undergo acid cleavage by antimonic acid. That is, this indicates that the standard for the acid strength necessary for the acid cleavage of the cationic polymerization resin is antimonic acid.

Figure 4:
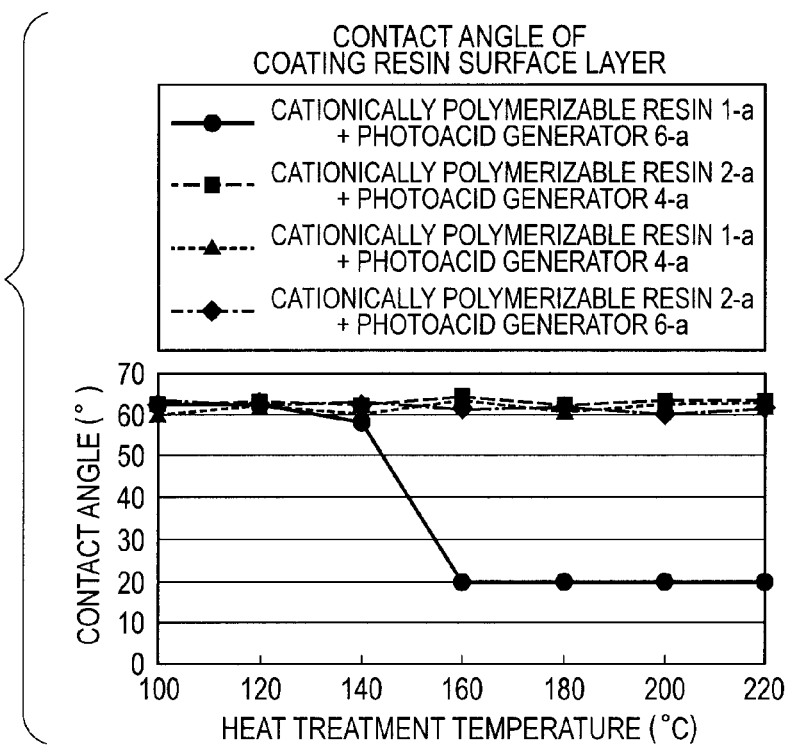
FIG. 4 is a graph showing contact angles of hydrophilic coating surfaces including cationic polymerization resins.

Next, as is the case with FIG. 3, FIG. 4 shows a correlation between the heat treatment temperatures and the static contact angles with pure water of surfaces of hydrophilic coatings, the hydrophilic coatings being each obtained by directly forming, on a substrate, the coating resin layer including the cationic polymerization resin and the photoacid generator each described in Table 2 and subjecting the layer to exposure and heat treatment. As seen from FIGS. 3 and 4, the contact angle decreases depending on a decrease in number of remaining ethers in the surface layer of the coating resin layer. It should be noted that the static contact angle with pure water of the hydrophilic coating surface was measured using a contact angle meter (trade name: "FACE CA-XA150" manufactured by Kyowa Interface Science Co., Ltd.). The measurement limit of the method of measuring the contact angle carried out here is 20° or less.

That is, as demonstrated in FIGS. 3 and 4, in the following combination, the surface layer of the coating resin layer including the cationic polymerization resin is easily hydrophilized at a heat treatment temperature of 160° C. or more. The combination is a combination of No. 1 of Table 2 including the cationic polymerization resin (1-a), which has an acid-cleavable linkage in its main chain, and the photoacid generator (6-a), which generates an acid having a stronger acid strength than that of antimonic acid, in the coating resin layer.

Figure 5:
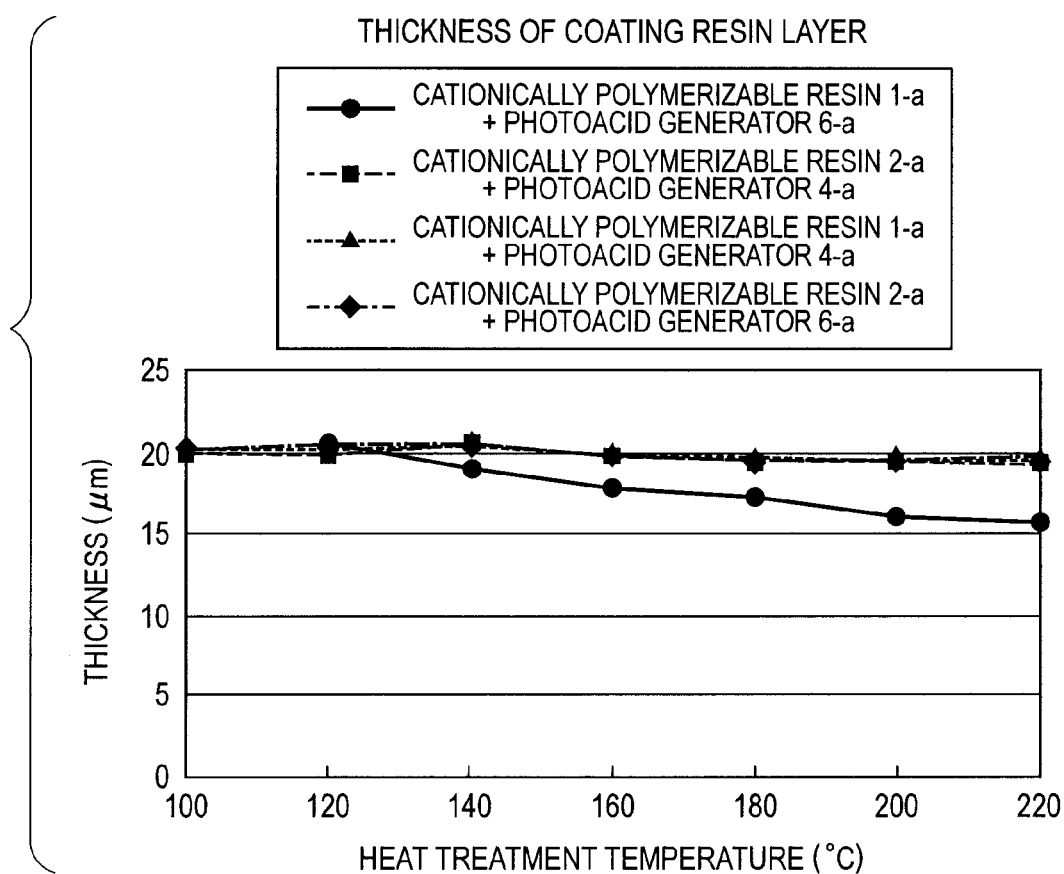
FIG. 5 is a graph showing thicknesses of hydrophilic coatings including cationic polymerization resins.

Next, as is the case with FIGS. 3 and 4, FIG. 5 shows a correlation between the heat treatment temperatures and the thicknesses of the hydrophilic coatings formed with the combinations described in Table 2. It should be noted that the thickness of the coating resin layer before heat treatment was 20 µm. As seen from FIGS. 3 and 5, the resin thickness decreases depending on a decrease in number of remaining ethers in the surface layer of the coating resin layer. That is, this indicates that not only the ether linkage in the surface layer of the resin but also the ether linkage in the resin is cleaved. In this case, there is a risk of a reduction in reliability of the resin layer such as a reduction in adherence between the resin layer and the substrate.

As described above, the following is required for hydrophilizing the surface layer without impairing the reliability of the coating resin layer. That is, like the present invention, such cationic polymerization resin which has an acid-cleavable linkage as represented, for example, by each of the formula 1-a to the formula 1-i is used in a coating resin layer, and on the coating resin layer, a photoacid generator layer including the photoacid generator B which generates an acid having a strong acid strength as represented, for example, by each of the formula 6-a to the formula 6-j is laminated. In addition, it is necessary to impregnate the photoacid generator B which generates an acid having a strong acid strength into only the surface layer of the coating resin layer.

Further, the upper limit of the heat treatment temperature in the step (4) is preferably 250° C. or less in consideration of heat decomposition of the coating resin layer 2b cured in the step (3).

TABLE 2

| Coating resin layer | |
|---|---|
| Cationic polymerization resin | Photoacid generator |
| No. 1 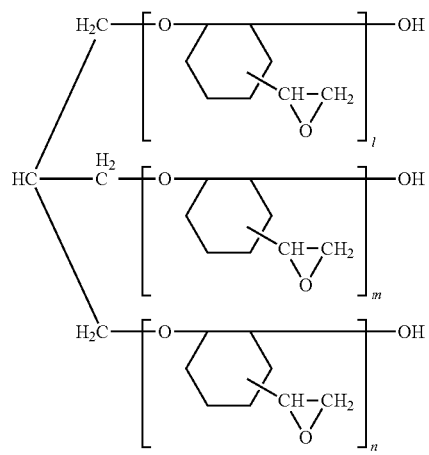 (1-a) | 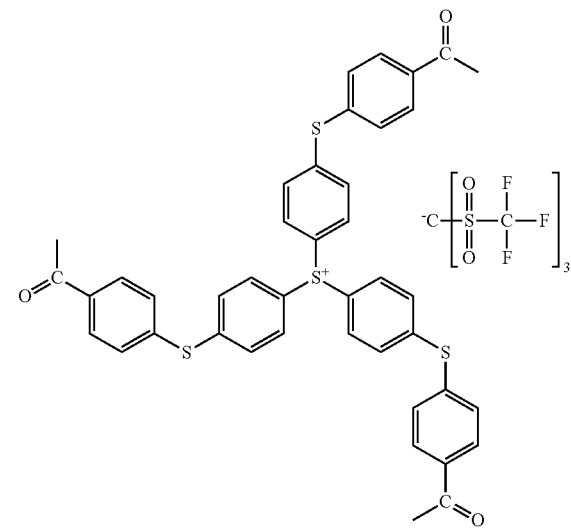 (6-a) |

TABLE 2-continued
| Coating resin layer | |
|---|---|
| Cationic polymerization resin | Photoacid generator |
| No. 2 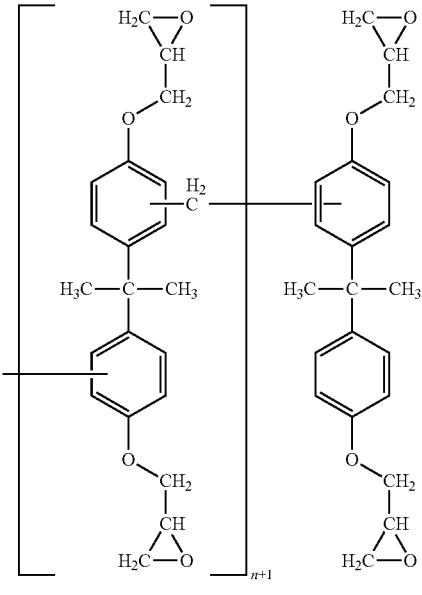 (2-a) | 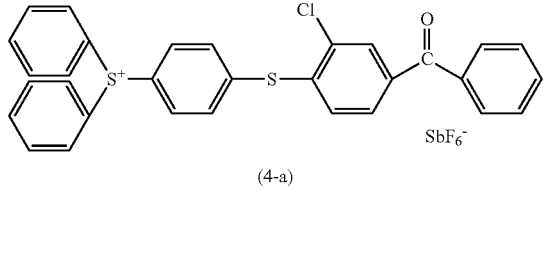 (4-a) |
| No. 3 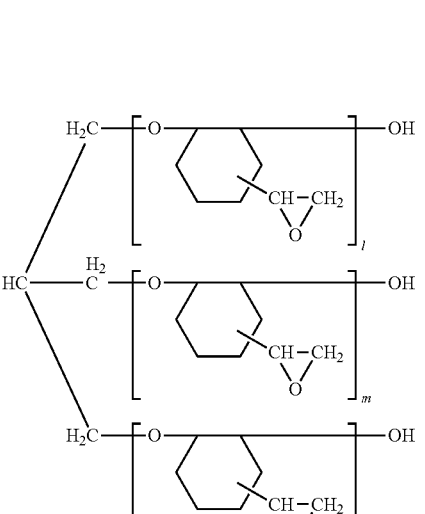 (1-a) | 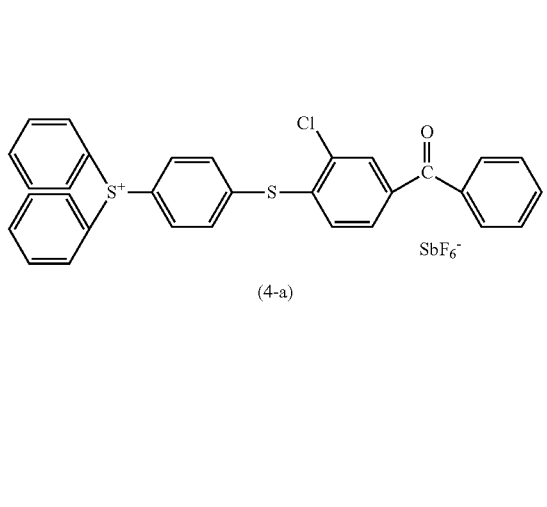 (4-a) |

TABLE 2-continued

| Coating resin layer | |
|---|---|
| Cationic polymerization resin | Photoacid generator |
| No. 4 (structure 2-a) | (6-a) |

Next, an example of the process for forming an ink jet recording head is described below. In the steps in the process, the step of easily hydrophilizing a surface having ink ejection orifices (ejection orifice surface) is described by way of an example of the process for forming a hydrophilic coating according to the present invention.

A process for forming an ink jet recording head according to the present invention is a process for forming an ink jet recording head including: a substrate having energy generating elements formed thereon for generating energy necessary for ejecting ink; and an ink flow path member, which forms ejection orifices for ejecting ink and an ink flow path communicating with the ejection orifices and holding ink, and which is hydrophilized in its surface having the ejection orifices. Further, the process includes the steps of:

(I) forming, on the substrate, a coating resin layer including a cationic polymerization resin, which includes an acid-cleavable linkage in its main chain, and a photoacid generator A, which generates antimonic acid or an acid having a weaker acid strength than that of antimonic acid by irradiation with an active energy ray including ultraviolet light;

(II) laminating, on the coating resin layer, a photoacid generator holding layer including a photoacid generator B, which generates an acid having a stronger acid strength than that of antimonic acid by irradiation with the active energy ray, and a holder, which holds the photoacid generator B and can be removed in the step (III);

(III) forming the ejection orifices by removing the photoacid generator holding layer and curing the coating resin layer through exposure of the photoacid generator holding layer and the coating resin layer to the active energy ray to conduct development; and (IV) forming the ink flow path member by hydrophilizing a surface having the ejection orifices of the coating resin layer cured in the step (III) through heat treatment of the coating resin layer.

Figure 6:
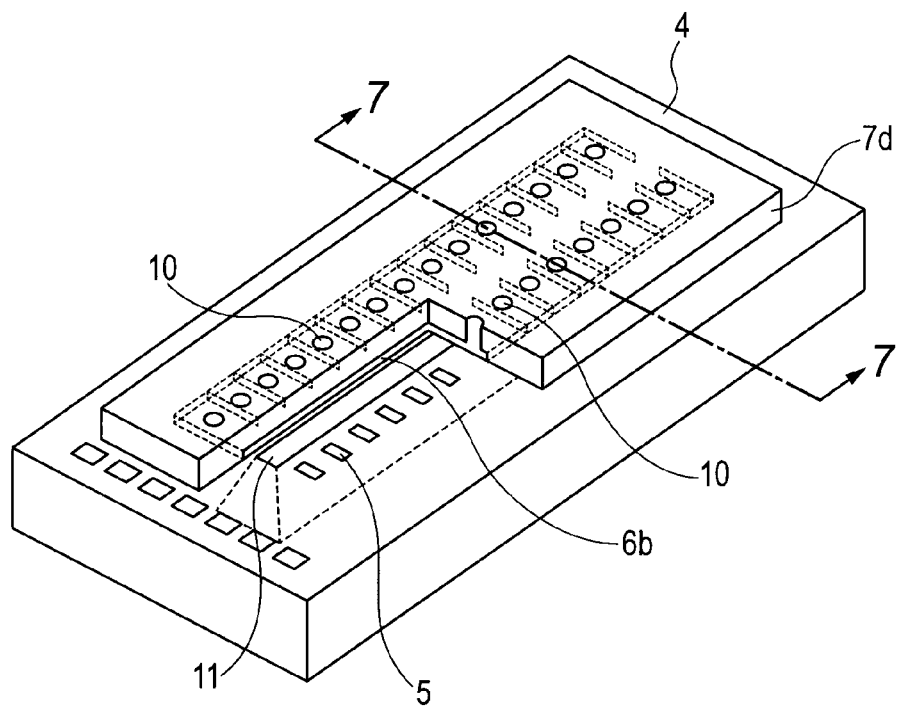
FIG. 6 is a schematic view of an ink jet recording head formed by a process for forming an ink jet recording head according to the present invention.

FIG. 6 illustrates an example of an ink jet recording head formed by the process for forming an ink jet recording head according to the present invention.

Figure 7:
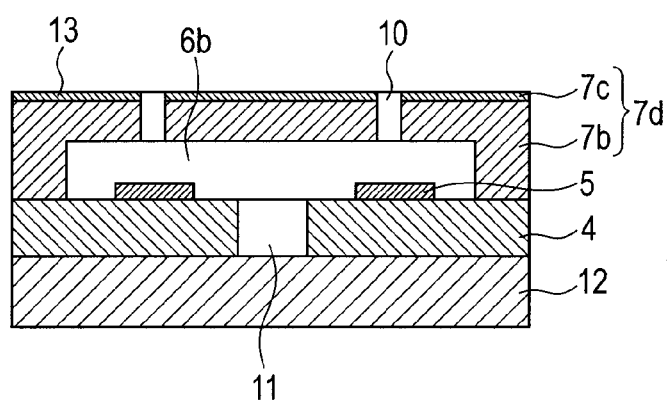
FIG. 7 is a schematic cross-sectional view of an ink jet recording head, which has an ink supply member and is formed by the process for forming an ink jet recording head according to the present invention.

The ink jet recording head illustrated in FIG. 6 has an ink flow path member 7d having a hydrophilized surface layer, i.e., a hydrophilic coating (the surface layer is a hydrophilic layer 7c) on a substrate 4 having thereon multiple energy generating elements 5 for generating energy necessary for ejecting ink. It should be noted that the ink flow path member 7d forms ink ejection orifices 10 for ejecting ink and an ink flow path 6b communicating with the ink ejection orifices 10 and holding ink. Further, the substrate 4 is provided with an ink supply port 11 for supplying ink to the ink flow path 6b. Further, FIG. 7 is a view illustrating a cross-section taken along the line 7-7 of FIG. 6 of an ink jet recording head having an ink supply member 12 adhered to the back surface of the substrate 4 in the ink jet recording head of FIG. 6.

Hereinafter, an exemplary embodiment of the present invention is described in detail. However, the present invention is not limited thereto.

Figure 8A:
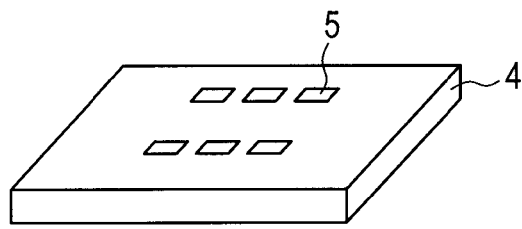
FIGS. 8A, 8B, 8C, 8D, 8E, 8F, 8G and 8H are views for illustrating the respective steps of the process for forming an ink jet recording head according to the present invention.

As illustrated in FIG. 8A, the multiple energy generating elements 5 are arranged on the substrate 4 in two arrays at a given pitch. It should be noted that control signal input electrode (not shown) for driving the energy generating elements 5 is connected to the elements.

Hereinafter, the embodiment is described with reference to FIGS. 8B to 8H and 7. FIGS. 8B to 8H are step-by-step cross-sectional views each corresponding to the cross-section taken along the line 7-7 of FIG. 6.

Step (a1)

First, a positive photosensitive resin layer (not shown) including a positive photosensitive resin is formed on the substrate 4 having the energy generating elements 5 formed thereon. An ink flow path pattern 6a may be formed by patterning the positive photosensitive resin layer as necessary like a step (a2) to be described later.

The positive photosensitive resin included in the positive photosensitive resin layer is not particularly limited, but preferred is a material having a low absorbance for ultraviolet light used for exposure of a coating resin layer 7a to be described later. Also preferred is a material sensitive to an active energy ray having a shorter wavelength than that of the ultraviolet light to be used, for example, excimer laser such as ArF laser or KrF laser, or Deep UV light. Examples of the material include polymethyl isopropenyl ketone, which can be exposed to Deep UV light.

A process for forming the positive photosensitive resin layer is, for example, the following process. First, the positive photosensitive resin is appropriately dissolved in a solvent and applied by a spin coating process. After that, the resultant may be subjected to prebaking to form the positive photosensitive resin layer.

The thickness of the positive photosensitive resin layer may be appropriately selected depending on a desired ink flow path height without any particular limitation, but is preferably 5 µm or more and 20 µm or less.

Step (a2)

Figure 8B:
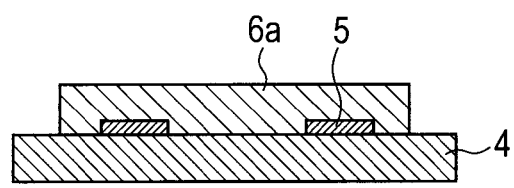

Next, the ink flow path pattern 6a is formed by patterning the positive photosensitive resin layer (FIG. 8B).

A process for patterning the positive photosensitive resin layer is, for example, the following process. First, the positive photosensitive resin layer is irradiated via a mask with an active energy ray capable of photosensitizing the positive photosensitive resin to perform pattern exposure. After that, the layer may be developed with, for example, a solvent capable of dissolving the positive photosensitive resin and subjected to rinsing treatment to form the ink flow path pattern 6a.

Step (a3): Corresponding to Step (I)

Figure 8C:
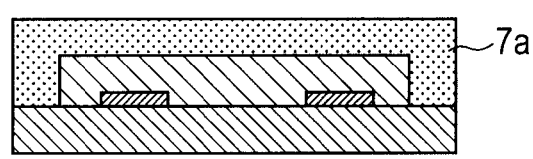

Next, the coating resin layer 7a including a cationic polymerization resin and a photoacid generator A is formed on the ink flow path pattern 6a and the substrate 4 (FIG. 8C).

It should be noted that the cationic polymerization resin may be any cationic polymerization resin which has an acid-cleavable linkage such as an ether linkage or an ester linkage in its main chain, and examples thereof include the compound represented, for example, by each of the formula 1-a to the formula 1-i as described above. Further, the photoacid generator A may be any photoacid generator which generates antimonic acid or an acid having a weaker acid strength than that of antimonic acid by irradiation with an active energy ray including ultraviolet light, and examples thereof include the compound represented, for example, by each of the formula 4-a to the formula 4-j as described above.

A process for forming the coating resin layer 7a is, for example, the following process. That is, the process is a process including applying a solution which is obtained by appropriately dissolving materials for the coating resin layer 7a in a solvent, onto the ink flow path pattern 6a and the substrate 4 by a spin coating process. It should be noted that the solvent for dissolving the materials for the coating resin layer 7a may be appropriately selected from solvents which do not dissolve the ink flow path pattern 6a and used.

The thickness of the coating resin layer 7a is preferably 3 µm or more in terms of a thickness on the ink flow path pattern 6a (distance from the surface of the coating resin layer to the ink flow path pattern 6a) in consideration of the strength of the resin layer. Further, the upper limit of the thickness is not particularly limited as long as the developability at an ink ejection orifice portion is not impaired, but is preferably 50 µm or less in terms of a thickness on the ink flow path pattern 6a.

Step (a4): Corresponding to Step (II)

Figure 8D:
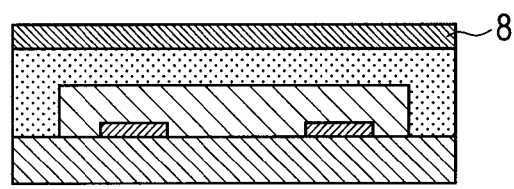

Next, a photoacid generator holding layer 8 including a holder and a photoacid generator B is laminated on the coating resin layer 7a (FIG. 8D).

The photoacid generator B may be any photoacid generator which generates an acid having a stronger acid strength than that of antimonic acid by irradiation with an active energy ray including ultraviolet light, and examples thereof include such compounds as represented by the formula 6-a to the formula 6-j as described above.

Further, the holder for the photoacid generator B may be any holder which can hold the photoacid generator B in the surface layer of the coating resin layer 7a and which can be removed through development treatment in the subsequent step (a5), and may be a monomer or a polymer. Examples thereof include a novolac resin and a cyclized rubber.

A process for forming the photoacid generator holding layer 8 is, for example, the following process. That is, the process is a process including applying a solution which is obtained by appropriately dissolving materials for forming the photoacid generator holding layer in a solvent, onto a coating resin layer by a spin coating process. A solvent for dissolving the materials for forming the photoacid generator holding layer may be appropriately selected from solvents which do not dissolve the coating resin layer 7a and used.

The thickness of the photoacid generator holding layer 8 is not particularly limited as long as the removability is not impaired and ink ejection orifices can be formed, but is desirably 3 µm or less in terms of a thickness on the coating resin layer 7a.

(Step (a5): Corresponding to Step (III))

Figure 8E:
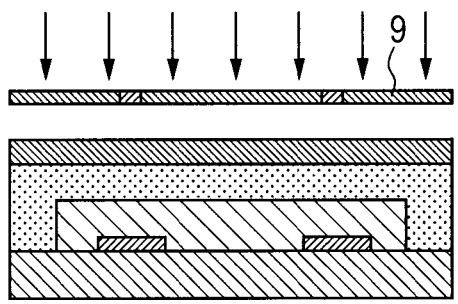
Figure 8F:
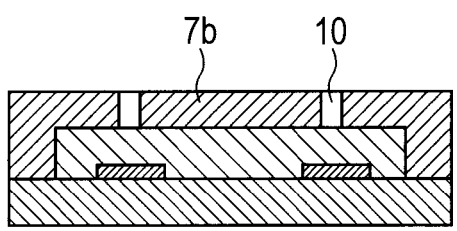

Next, ink ejection orifices 10 are formed by removing the photoacid generator holding layer 8 and curing the coating resin layer 7a through exposure of the coating resin layer 7a and the photoacid generator holding layer 8 to an active energy ray including ultraviolet light to conduct development (FIGS. 8E and 8F).

A process for forming the ink ejection orifices is, for example, the following process. First, the coating resin layer 7a and the photoacid generator holding layer 8 are irradiated with the i-line as an active energy ray via a mask 9 corresponding to the shape of each of the ink ejection orifices 10. After that, the photoacid generator holding layer 8 may be removed through heating, development, and rinsing treatment to form the ink ejection orifices 10.

It should be noted that, in FIG. 8F, an acid (not shown) generated from the photoacid generator B derived from the photoacid generator layer 8 has been impregnated into the surface layer of the cured coating resin layer 7b.

The width of each of the ink ejection orifices 10 may be appropriately set depending on the size of each of ink droplets to be ejected.

Step (a6)

Figure 8G:
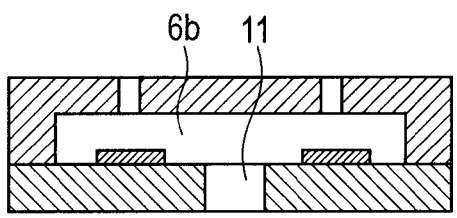

Next, an ink supply port 11 is formed by etching. In addition, the ink flow path pattern 6a is removed to form an ink flow path 6b (FIG. 8G).

A process for removing the ink flow path pattern 6a is, for example, a process including removing the ink flow path pattern 6a by immersing the substrate in a solvent capable of dissolving the ink flow path pattern. Further, as necessary, the ink flow path pattern 6a may be exposed to an active energy ray capable of photosensitizing the ink flow path pattern to enhance the solubility.

Step (a7): Corresponding to Step (IV)

Figure 8H:
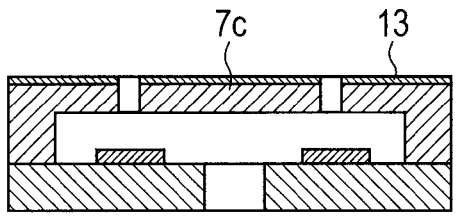

Next, a hydrophilic layer 7c is formed on a surface layer of the coating resin layer 7b cured through heat treatment (FIG. 8H).

The heat treatment may be carried out at any temperature as long as an acid generated from the photoacid generator B derived from the photoacid generator holding layer 8 impregnated into the surface layer of the cured coating resin layer 7b can cause acid cleavage of the cationic polymerization resin in the surface layer of the cured coating resin layer 7b to generate a polar group and hydrophilize the surface layer. The temperature is preferably 160° C. or more as described above.

Further, the heat treatment temperature is preferably 250° C. or less in consideration of physical properties of the coating resin layer as described above.

It should be noted that the ink flow path surface preferably has a static contact angle with pure water of 50° or more.

The "ink flow path surface" as used herein refers to a surface on the ink flow path 6b side of the ink flow path member 7d, and the contact angle at this site may be measured as a static contact angle with pure water by peeling the ink flow path member 7d from the substrate 4, for example.

The contact angle with pure water is preferably 50° or more and preferably 70° or less in consideration of the efficient refilling of ink and the stability of meniscus oscillation of ink after the refilling.

After that, the energy generating elements 5 are electrically joined in order to drive the elements. In addition, an ink supply member 12 for supplying ink and the like are connected. Thus, an ink jet recording head is completed (FIG. 7).

The ink jet recording head according to the present invention is mountable to apparatuses such as a printer, a copier, a facsimile having a communication system, and a word processor having a printer unit, and industrial recording apparatuses integrally combined with various processing apparatuses. Further, the use of the ink jet recording head of the present invention allows recording in a variety of recording media made of paper, yarn, fiber, leather, metal, plastic, glass, wood, ceramic, and the like.

EXAMPLES

Production of Ink Jet Recording Head

Hereinafter, the present invention is further specifically described by way of examples. However, the present invention is not limited to these examples.

Evaluation of Contact Angle

A surface having ink ejection orifices (ink ejection orifice surface: reference numeral 13 of FIG. 8H) of an ink jet recording head produced in each of Examples was measured for its static contact angle with pure water using a contact angle meter (trade name: "FACE CA-XA150" manufactured by Kyowa Interface Science Co., Ltd.).

Evaluation of Substrate Adherence

An ink jet recording head produced in each of Examples and Comparative Examples was immersed in ink having the following composition at 60° C. for 1 week and then evaluated for its adherence between an ink flow path member 7*d* and a substrate 4.

Ink Composition

Pure water/diethylene glycol/isopropyl alcohol/lithium acetate/black dye (Food Black 2)=79.4/15/3/0.1/2.5 (mass ratio).

Example 1

First, as illustrated in FIG. 8A, polymethyl isopropenyl ketone (trade name: "ODUR-1010" manufactured by TOKYO OHKA KOGYO CO., LTD.) as a positive photosensitive resin was applied onto a silicon substrate 4 having electrothermal transducing elements 5 formed thereon as energy generating elements by spin coating. Next, the silicon substrate was subjected to prebaking at 120° C. for 6 minutes. Then, pattern exposure of an ink flow path pattern 6*a* (exposure amount: 14 J/cm$^2$) was carried out with a Deep UV exposing machine (trade name: "UX-3000" manufactured by Ushio Inc.). After that, the resultant was developed with methyl isobutyl ketone and subjected to rinsing treatment with isopropyl alcohol (IPA). Thus, the ink flow path pattern 6*a* was formed (FIG. 8B). It should be noted that the ink flow path pattern 6*a* had a thickness of 10 µm.

Next, the following resin composition 1 was dissolved at a concentration of 50 mass % in a mixed solvent of methyl isobutyl ketone and diethylene glycol monomethyl ether. The solution was applied onto the ink flow path pattern 6*a* and the silicon substrate 4 by spin coating, thereby forming a coating resin layer 7*a* (FIG. 8C). It should be noted that the thickness of the coating resin layer 7*a* on the ink flow path pattern 6*a* (distance from the surface of the coating resin layer 7*a* to the ink flow path pattern 6*a*) was 10 µm.

Resin Composition 1

Cationic Polymerization Resin

"EHPE-3150" (trade name: manufactured by DAICEL CHEMICAL INDUSTRIES, LTD., compound represented by the formula 1-a): 100 parts by mass

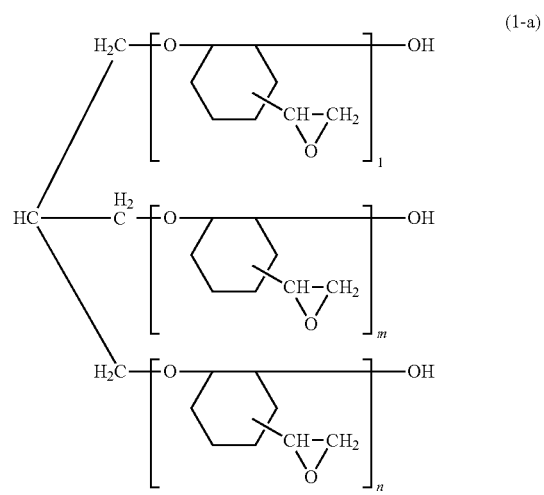

(1-a)

(In the formula 1-a, l, m, and n each independently represent an integer of 1 or more.)

Photoacid Generator A

Compound represented by the formula 4-a: 1.5 parts by mass

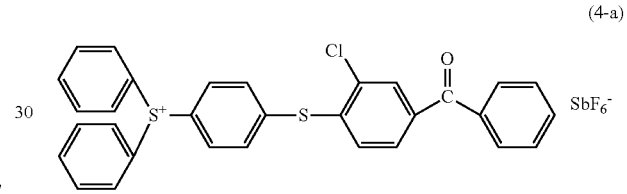

(4-a)

Next, the following photoacid generator B-1 was dissolved at a concentration of 1 mass % in a novolac resin resist as a holder. The solution was applied onto a coating resin layer 7*a* by spin coating to form a photoacid generator holding layer 8 (FIG. 8D). It should be noted that the thickness of the photoacid generator holding layer 8 on the coating resin layer 7*a* was 1 µm.

Photoacid Generator B-1

"GSID26-1" (trade name, manufactured by Ciba Japan K.K., compound represented by the formula 6-a)

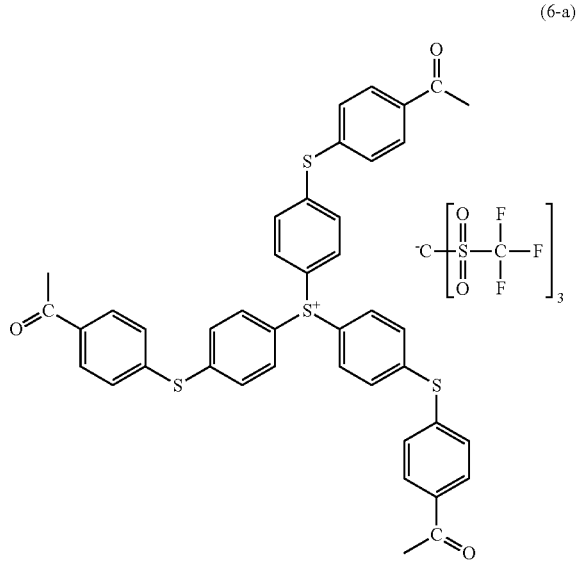

(6-a)

Next, the coating resin layer 7a and the photoacid generator holding layer 8 were exposed (exposure amount: 4,000 J/m$^2$) via a mask 9 corresponding to the shape of each of ink ejection orifices 10 using an i-line stepper exposing machine (i5 manufactured by Canon Inc.) (FIG. 8E).

Next, the layers were subjected to post-exposure baking (PEB) at 90° C. for 4 minutes, development with methyl isobutyl ketone, and rinsing treatment with IPA. Thus, the photoacid generator holding layer 8 was removed and the coating resin layer 7a was cured to form the ink ejection orifices 10 (FIG. 8F). The cured coating resin layer is represented by reference numeral 7b. It should be noted that any of the ink ejection orifices 10 had a diameter of 10 μm. Further, an acid generated from the photoacid generator B-1 had been impregnated into the surface layer of the coating resin layer 7b cured at this time.

Next, the substrate was subjected to etching in tetramethylammonium hydroxide (TMAH) to form an ink supply port 11. Then, in order to enhance the solubility of the ink flow path pattern 6a, the resultant was exposed (exposure amount: 27 J/cm$^2$) again with the Deep UV exposing apparatus (trade name: "UX-3000" manufactured by Ushio Inc.) used in forming the ink flow path pattern 6a. After that, the resultant was immersed in methyl lactate while being irradiated with an ultrasound to dissolve the remaining ink flow path pattern 6a (FIG. 8G).

Next, hydrophilization was carried out by generating a polar group derived from the cationic polymerization resin on the cured coating resin layer 7b by heating at 200° C. for 1 hour (FIG. 8H).

Finally, an ink supply member 12 was bonded to the back surface of the silicon substrate 4 having formed therein the ink supply port 11. Thus, an ink jet recording head was completed (FIG. 7).

Table 3 shows the evaluation results of the contact angle of the ink ejection orifice surface and the substrate adherence of the ink jet recording head.

Example 2

An ink jet recording head was produced and evaluated in the same manner as in Example 1 except that the following resin composition 2 was used in place of the resin composition 1. Table 3 shows the evaluation results.
Resin Composition 2
Cationic Polymerization Resin
"XA8040" (trade name: manufactured by Japan Epoxy Resin Co., Ltd., compound represented by the formula 1-e):
  100 parts by mass
Photoacid Generator A
Compound represented by the formula 4-a: 1.5 parts by mass

Comparative Example 1

An ink jet recording head was produced and evaluated in the same manner as in Example 1 except that the following resin composition 3 was used in place of the resin composition 1. Table 3 shows the evaluation results.
Resin Composition 3
Cationic Polymerization Resin
"157S70" (trade name: manufactured by Japan Epoxy Resin Co., Ltd., compound represented by the formula 2-a):
  100 parts by mass

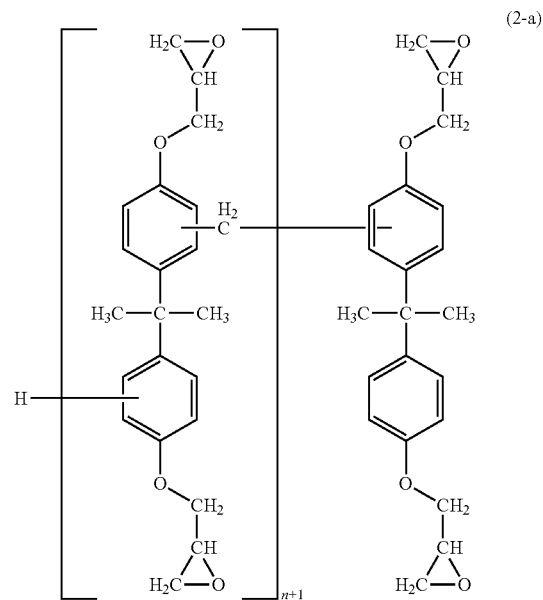

(2-a)

(In the formula 2-a, n represents an integer of 1 or more.)
Photoacid Generator A
Compound represented by the formula 4-a: 1.5 parts by mass

Comparative Example 2

An ink jet recording head was produced and evaluated in the same manner as in Example 1 except that the following photoacid generator B-2 was used in place of the photoacid generator B-1 included in the photoacid generator holding layer 8. Table 3 shows the evaluation results.
Photoacid Generator B-2
Compound represented by the formula 4-a: 1.5 parts by mass

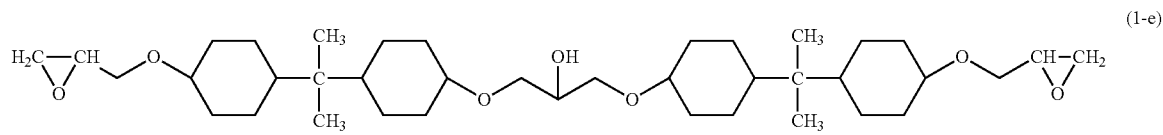 [SMILES: CC(C)(C1CCC(OCC(O)COC2CCC(C(C)(C)C3CCC(OCC4CO4)CC3)CC2)CC1)C1CCC(OCC2CO2)CC1]

(1-e)

TABLE 3

| | Coating resin layer | | Photoacid generator holding layer | | Contact angle with pure water | Substrate adherence |
|---|---|---|---|---|---|---|
| | Cationic polymerization resin | Photoacid generator | | Photoacid generator | | |
| Example 1 | Structure (1-a): cationic polymerization resin with three repeating units containing cyclohexane rings with epoxide (CH–CH₂–O) groups and OH groups, subscripts l, m, n | Structure (4-a): sulfonium salt with naphthyl, phenyl, and chloro-benzoyl-thiophenyl groups, SbF₆⁻ counterion | | Structure (6-a): tris(4-(4-acetylphenylthio)phenyl)sulfonium with CF₃SO₃⁻ counterion | 20° or less | No peeling |

TABLE 3-continued
| | Coating resin layer | | Photoacid generator holding layer | | Contact angle with pure water | Substrate adherence |
|---|---|---|---|---|---|---|
| | Cationic polymerization resin | Photoacid generator | | Photoacid generator | | |
| Example 2 | (1-e) 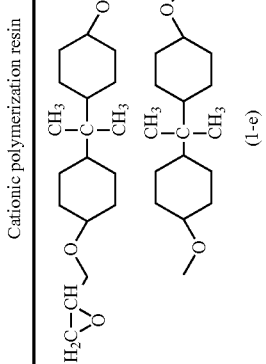 | (4-a) 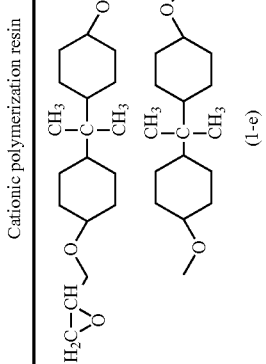 | | (6-a) 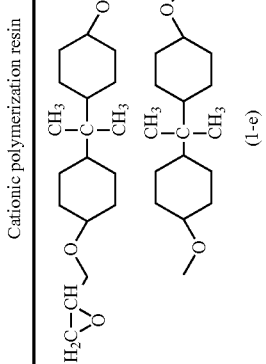 | 20° or less | No peeling |

TABLE 3-continued

| | Coating resin layer | | Photoacid generator holding layer | | Contact angle with pure water | Substrate adherence |
|---|---|---|---|---|---|---|
| | Cationic polymerization resin | Photoacid generator | | Photoacid generator | | |
| Comparative Example 1 | (2-a) | (4-a) | | (6-a) | 60° | No peeling |
| Comparative Example 2 | (1-a) | (4-a) | | (4-a) | 60° | No peeling |

As shown in Table 3, an ink jet recording head having an ink flow path member 7d whose ink ejection orifice surface was subjected to hydrophilic treatment was able to be produced without impairing the adherence with the substrate 1 by Example 1 and Example 2.

According to the present invention, it is possible to provide the process for easily forming a hydrophilic coating by photolithography without requiring any apparatus exclusively used for hydrophilic treatment, and the hydrophilic coating formed by the process. It is also possible to provide the process for forming an ink jet recording head including the hydrophilic coating and the ink jet recording head formed by the process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-250777, filed Nov. 9, 2010, which is hereby incorporated by reference herein in its entirety.

What is claimed is:

1. A process for forming a hydrophilic coating having a hydrophilized surface, comprising the steps of:

(1) forming, on a substrate, a coating resin layer including a cationic polymerization resin which includes an acid-cleavable linkage in its main chain, and a photoacid generator which generates antimonic acid or an acid having a weaker acid strength than that of antimonic acid by irradiation with an active energy ray including ultraviolet light;

(2) laminating, on the coating resin layer, a photoacid generator holding layer including a photoacid generator which generates an acid having a stronger acid strength than that of antimonic acid by irradiation with the active energy ray, and a holder which holds the photoacid generator and can be removed in the step (3);

(3) removing the photoacid generator holding layer and curing the coating resin layer through exposure of the photoacid generator holding layer and the coating resin layer to the active energy ray to conduct development; and (4) forming a hydrophilic coating by hydrophilizing a surface of the coating resin layer cured in the step (3) through heat treatment of the coating resin layer, wherein the photoacid generator which generates an acid having a stronger acid strength than that of antimonic acid comprises a compound represented by the following formula 6-a

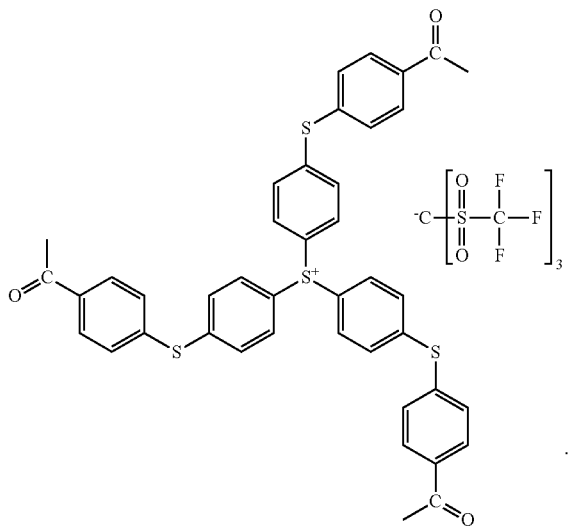

(6-a)

2. A process for forming a hydrophilic coating according to claim 1, wherein the cationic polymerization resin comprises an ether linkage as an acid-cleavable linkage in its main chain.

3. A process for forming a hydrophilic coating according to claim 1, wherein the cationic polymerization resin comprises an ester linkage as an acid-cleavable linkage in its main chain.

4. A process for forming a hydrophilic coating according to claim 1, wherein the photoacid generator which generates an acid having a stronger acid strength than that of antimonic acid generates methide acid.

5. A process for forming a hydrophilic coating according to claim 1, wherein the cationic polymerization resin comprises a compound represented by the following formula 1-a, and the photoacid generator which generates antimonic acid or an acid having a weaker acid strength than that of antimonic acid comprises a compound represented by the following formula 4-a:

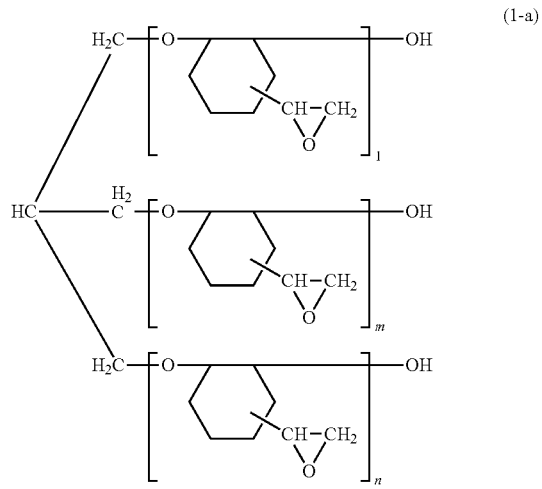

(1-a)

in the formula 1-a, l, m, and n each independently represent an integer of 1 or more (4-a)

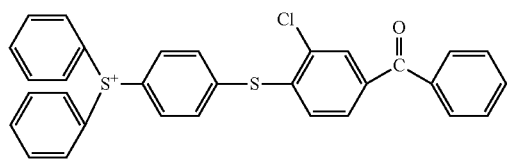

(6-a)

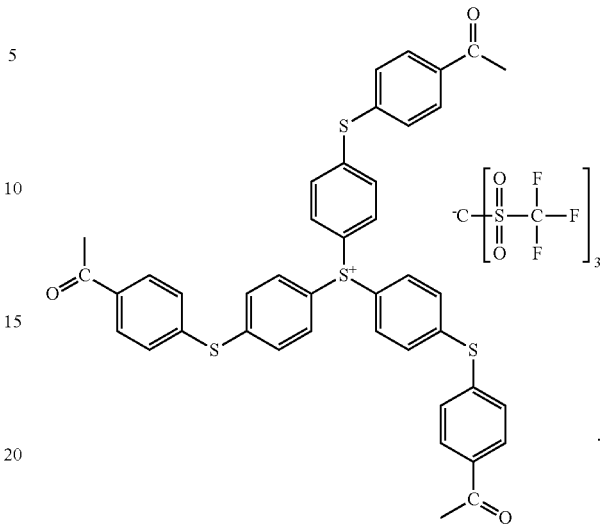

6. A process for forming a hydrophilic coating according to claim 1, wherein the heat treatment of the coating resin layer cured in the step (3) in the step (4) is carried out at a temperature of 160° C. or more.

7. A process for forming an ink jet recording head comprising a substrate having energy generating elements formed thereon for generating energy necessary for ejecting ink; and an ink flow path member, which forms ejection orifices for ejecting ink and an ink flow path communicating with the ejection orifices and holding ink, and which is hydrophilized in its surface having the ejection orifices, the process comprising the steps of:

(I) forming, on a substrate having energy generating elements formed thereon, a coating resin layer including a cationic polymerization resin, which includes an acid-cleavable linkage in its main chain, and a photoacid generator, which generates antimonic acid or an acid having a weaker acid strength than that of antimonic acid by irradiation with an active energy ray including ultraviolet light;

(II) laminating, on the coating resin layer, a photoacid generator holding layer including a photoacid generator which generates an acid having a stronger acid strength than that of antimonic acid by irradiation with the active energy ray, and a holder which holds the photoacid generator and can be removed in the step (III);

(III) forming the ejection orifices by removing the photoacid generator holding layer and curing the coating resin layer through exposure of the photoacid generator holding layer and the coating resin layer to the active energy ray to conduct development; and (IV) forming the ink flow path member by hydrophilizing a surface having the ejection orifices of the coating resin layer cured in the step (III) through heat treatment of the coating resin layer, wherein the photoacid generator which generates an acid having a stronger acid strength than that of antimonic acid comprises a compound represented by the following formula 6-a 8. A process for forming an ink jet recording head according to claim 7, wherein the cationic polymerization resin comprises an ether linkage as an acid-cleavable linkage in its main chain.

9. A process for forming an ink jet recording head according to claim 7, wherein the cationic polymerization resin comprises an ester linkage as an acid-cleavable linkage in its main chain.

10. A process for forming an ink jet recording head according to claim 7, wherein the photoacid generator which generates an acid having a stronger acid strength than that of antimonic acid, generates methide acid.

11. A process for forming an ink jet recording head according to claim 7, wherein the cationic polymerization resin comprises a compound represented by the following formula 1-a, and the photoacid generator which generates antimonic acid or an acid having a weaker acid strength than that of antimonic acid comprises a compound represented by the following formula 4-a:

(1-a)

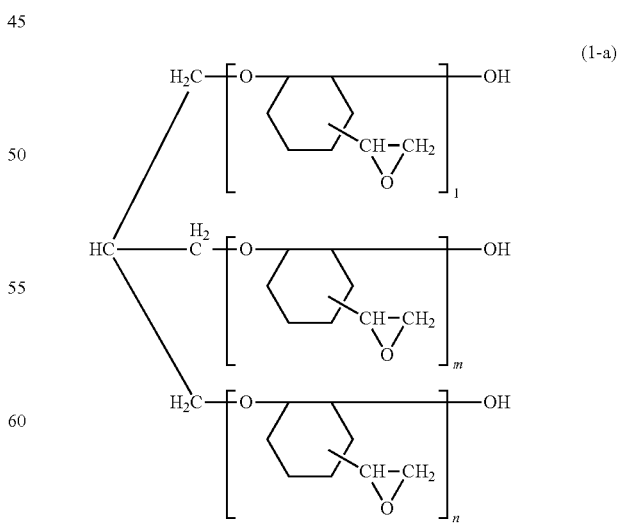

in the formula 1-a, l, m, and n each independently represent an integer of 1 or more

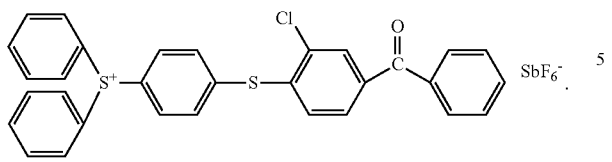
(4-a)
12. A process for forming an ink jet recording head according to claim 7, wherein the heat treatment of the coating resin layer cured in the step (III) in the step (IV) is carried out at a temperature of 160° C. or more.
* * * * *